UNITED STATES PATENT OFFICE 2,063,240

SYNTHETIC RESIN VARNISH COMPOSITIONS

Charles L. Gabriel, Lawrence, N. Y., assignor, by mesne assignments, to Resinox Corporation, New York, N. Y., a corporation of Delaware No Drawing. Application May 11, 1931, Serial No. 536,692

4 Claims. (Cl. 134—26)

The present invention relates to improvements in synthetic resin compositions. More particularly, it relates to resinous compositions of improved properties which are especially valuable in varnishes.

Attempts have been made in the past to prepare varnishes from synthetic resins such as the phenol-aldehyde type by incorporating such resins in suitable solvents. Such solutions are used either for coating surfaces, as of furniture and floors, or for impregnating materials like absorbent paper for the purpose of preparing punch stock. In the latter case a laminated product is prepared from the impregnated paper by curing under pressure at an elevated temperature. The product should be flexible and capable of being cut or having holes punched in it without cracking, checking, or otherwise becoming defective and unsightly. Ordinarily, however, these defects will be encountered and render the article unsuited for many purposes. Difficulties of a similar nature will also be encountered where the resins are used for coatings or for molded articles.

It has now been discovered that by incorporating with synthetic resins such as, for example, those of the heat-hardening type or with solutions of such synthetic resins neutral esters formed by the interaction of dihydric alcohols and polybasic acids a greatly improved product is obtained which does not possess the defects of checking, cracking, etc., enumerated above.

When, for example, ethylene glycol is heated with phthalic anhydride, a half ester of phthalic acid is first easily formed. By conducting the operation in the presence of an esterification catalyst and continued heating the free carboxyl and hydroxyl groups present in the half ester first formed may be caused to react, producing a neutral ester of the following formula:

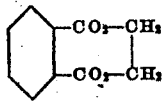

It is generally impossible, however, to conduct the reaction so that the product comprises only the neutral glycol phthalate ester above shown, since one molecule of the product containing the free hydroxyl and the free carboxyl group, will react with another molecule, producing various other compounds of high molecular weight. The following equations will illustrate the type of reaction thus taking place and the nature of the product formed:

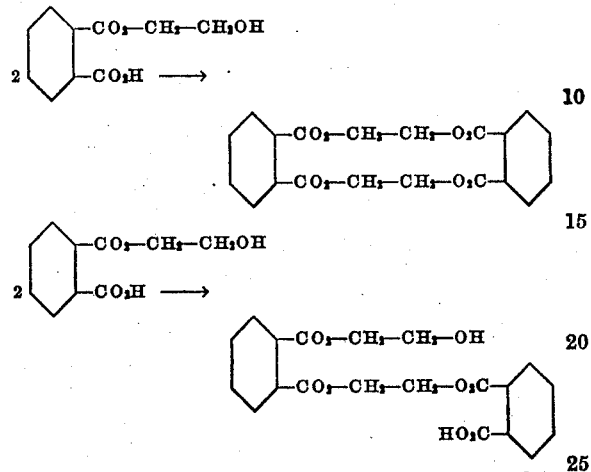

Other reactions tending to produce complex molecular structures will be apparent to those skilled in the art.

It is possible to produce at will compositions of an entirely fluid nature (though viscous) or products so viscous at ordinary temperatures that they can not be poured. The nature of the products, including the molecular weight, depends upon the condition of synthesis. Liquid products with molecular weights of 500 or less may be prepared by conducting the reaction quickly and at relatively low temperatures. Products having molecular weights of about 900 or above may be produced by the use of longer reaction periods and higher temperatures. The following example will illustrate a general method of obtaining neutral esters of dihydric alcohols of polybasic organic acids.

Example 74 grams of phthalic anhydride and 20 grams of ethylene glycol are heated together at 150° C. for ½ hour. 5 c. c. of concentrated sulphuric acid, 11 grams of glycol and 5 grams of benzol are then added and the mixture heated to distill off the benzol. After the benzol vapor distills off it carries with it, as a constant boiling mixture, the water formed during the reaction. Heating is then continued for 3 hours, benzol being added from time to time as needed. In this manner, the reaction temperature is maintained at 100° C. or less, the product is washed with alkali and water, and dried in vacuo at 150° C. It is found to be a viscous oily liquid showing a molecular weight of slightly less than 500 and is easily soluble in benzol and other common solvents.

This type of product may also be prepared by heating equal molar portions of glycol and phthalic anhydride at 180° C. for 1 hour and then further condensing by heating, at the same temperature, in vacuo for varying periods of time, thus obtaining varied degrees of condensation. If a neutral product is desired it will generally be necessary to wash this product with dilute alkali.

It is, of course, possible to substitute for both of the reactants used in the specific example above various other materials so as to obtain products such as 1,3-butylene phthalate, ethylene mellitate, ethylene sebacate, 1,3-butylene sebacate, ethylene propylmalonate, ethylene succinylo succinate, etc.

Esters of the type set forth above are viscous non-volatile liquids of high molecular weight, and as previously indicated, particularly well suited for use with synthetic resins such as phenol-aldehyde, urea-formaldehyde, etc. in the preparation of punch stock molded products, varnishes, etc. The esters in question are compatible with the resins and soluble in the usual solvents, such as alcohol, acetone, benzol, etc., used in the production of resinous varnishes. In preparing a varnish generally 20–40 parts of a neutral ester of dihydric alcohol with a polybasic acid, as for example, ethylene glycol phthalate, to 100 parts by weight of a resin of the heat-hardening type such as phenol-formaldehyde resin, may be incorporated in a suitable solvent or solvent mixture of the usual type, as for example, methyl or ethyl alcohols, acetone, methyl ethyl ketone, ethyl acetate, benzol, etc. Generally, about 20 parts by weight of solvent to 80 parts by weight of the ester-resin mixture will give a satisfactory resin of suitable consistency. It is, of course, possible to vary considerably the proportions set forth above without departing from the scope of the present invention. For some purposes a greater proportion of ester will be desirable while for other purposes a smaller amount than that specified will give suitable results.

Varnishes of the type hereinabove disclosed may be applied by the usual means directly to wood, metal, cloth, etc., and are particularly well suited to the production of laminated sheets and similar articles, the sheets thereby obtained being flexible and at the same time tough and resistant to deformation except where excessive quantities of the ester have been employed.

After applying the varnish, the coated material is allowed to dry at ordinary drying temperatures, say approximately 80° C., until the solvents and any moisture present have been evaporated. This temperature and the time of drying may, of course, be varied considerably depending upon the general operating conditions and the character of product desired. The temperature is next preferably raised for a time to 125–175° C. so as to convert the resin into the infusible and unreactive form. It is customary also in the case of laminated and molded products to subject the article being heated to pressures in the neighborhood of 2,000 pounds per square inch. This, however, may also be varied considerably depending upon the particular conditions under which it is desired to work and the article to be produced.

If desired, the neutral esters hereinabove referred to, may be incorporated with the resin without the aid of solvents. The product thus obtained may be subjected to heat and pressure as previously indicated to form molded products and the like.

What is claimed is:

1. A coating composition consisting essentially of a heat-hardening synthetic resin, a neutral liquid glycol phthalate obtained by completely esterifying phthalic acid with a glycol of the group consisting of ethylene glycol and 1,3-butylene glycol, and a volatile solvent for said resin and phthalate, in such proportions as to produce a liquid of varnish consistency and capable of forming a homogenous, flexible and tough film.

2. A coating composition consisting essentially of 100 parts of heat-hardening synthetic resin, 20 to 40 parts of a neutral liquid glycol phthalate obtained by completely esterifying phthalic acid with a glycol of the group consisting of ethylene glycol and 1,3-butylene glycol, and a volatile solvent for said resin and phthalate in such proportion as to produce a liquid of varnish consistency.

3. A coating composition consisting essentially of a heat-hardening synthetic resin, a neutral liquid ethylene phthalate obtained by completely esterifying phthalic acid with ethylene glycol, and a volatile solvent for said resin and phthalate, in such proportions as to produce a liquid of varnish consistency and capable of forming a homogenous, flexible and tough film.

4. A coating composition consisting essentially of 100 parts of a heat-hardening synthetic resin, 20 to 40 parts of a neutral liquid ethylene phthalate obtained by completely esterifying phthalic acid with ethylene glycol, and a volatile solvent for said resin and phthalate in such proportion as to produce a liquid of varnish consistency.

CHARLES L. GABRIEL.